(12) United States Patent
Yacob

(10) Patent No.: US 10,500,993 B2
(45) Date of Patent: Dec. 10, 2019

(54) FOLDING TRUCK BED BENCH

(71) Applicant: Ryan Yacob, Prospect Heights, IL (US)

(72) Inventor: Ryan Yacob, Prospect Heights, IL (US)

( * ) Notice: Subject to any disclaimer, the term of this patent is extended or adjusted under 35 U.S.C. 154(b) by 12 days.

(21) Appl. No.: 15/894,983

(22) Filed: Feb. 13, 2018

(65) Prior Publication Data

US 2018/0229631 A1    Aug. 16, 2018

Related U.S. Application Data

(60) Provisional application No. 62/458,246, filed on Feb. 13, 2017.

(51) Int. Cl.
*B60N 2/30* (2006.01)
*B60N 2/01* (2006.01)

(52) U.S. Cl.
CPC ........... *B60N 2/3095* (2013.01); *B60N 2/012* (2013.01)

(58) Field of Classification Search
CPC .............................. B60N 2/3095; B60N 2/012
USPC ....................................................... 296/65.05
See application file for complete search history.

(56) References Cited

U.S. PATENT DOCUMENTS

| 8,123,271 B1 * | 2/2012 | Wimberley | .......... B60N 2/3095 296/57.1 |
| 2008/0211270 A1 * | 9/2008 | Hu | .......................... B60N 2/005 297/188.08 |

* cited by examiner

*Primary Examiner* — Joseph D. Pape
*Assistant Examiner* — Dana D Ivey
(74) *Attorney, Agent, or Firm* — Matthew M. Googe; Robinson IP Law, PLLC

(57) ABSTRACT

A folding truck bed bench includes: an elongate bench portion hingedly attached along a length of a bed rail of the truck bed such that the elongate bench portion is substantially parallel to the bed rail of the truck bed; one or more foldable supports attached to the elongate bench portion for supporting the elongate bench portion. In a deployed position, the elongate bench portion is substantially parallel to a floor of the truck bed to such that the elongate bench portion provides a support surface. In a stowed position, the elongate bench portion is folded downward such that the elongate bench portion is adjacent a side of the truck bed.

8 Claims, 3 Drawing Sheets

FOLDING TRUCK BED BENCH

CROSS-REFERENCE TO RELATED APPLICATION

This application claims priority to U.S. Provisional Patent Application Ser. No. 62/458,246 to Ryan Yacob filed on Feb. 13, 2017, for a Folding Truck Bed Bench, the contents of which are incorporated herein by reference in its entirety.

FIELD

This disclosure relates to the field of vehicle seating devices. More particularly, this disclosure relates to a folding stowable bench seat that attaches to a truck bed.

BACKGROUND

Owners of pickup trucks will frequently use a bed of the pickup truck for tailgating and camping. Typically, when a person desires to sit in or on the bed of the pickup truck, the person will sit on a rail of the truck bed. Several occupants may be able to sit in the truck bed of a pickup truck by sitting along bed rails of the truck bed. However, truck bed rails are typically narrow and do not provide a comfortable seat for occupants of the truck bed. Further, occupants seated on the bed rails may fall out of the truck bed due to the narrow width of the bed rail and lack of support of the occupants.

While various attempts have been made to provide seating in truck beds, these attempts typically require complicated installation and removal procedures or otherwise occupy valuable storage space of the truck bed.

What is needed, therefore, is a folding stowable bench seat that attached along a bed rail of a pickup truck bed for supporting occupants seated along the bed rail.

SUMMARY

The above and other needs are met by a folding truck bed bench for installation in a truck bed. In a first aspect, a folding truck bed bench includes: an elongate bench portion hingedly attached along a length of a bed rail of the truck bed such that the elongate bench portion is substantially parallel to the bed rail of the truck bed; one or more foldable supports attached to the elongate bench portion for supporting the elongate bench portion. In a deployed position, the elongate bench portion is substantially parallel to a floor of the truck bed to such that the elongate bench portion provides a support surface. In a stowed position, the elongate bench portion is folded downward such that the elongate bench portion is adjacent a side of the truck bed.

In one embodiment, the truck bed bench further includes an elongate backrest hingedly attached to at least one of the bed rail and elongate bench portion, wherein the elongate backrest is movable between an upright position and a folded position.

In another embodiment, the truck bed bench further includes a cable attached to the elongate bench portion and elongate backrest to prevent movement of the elongate backrest beyond a desired upright position.

In yet another embodiment, the truck bed bench includes one or more feet attached to ends of the one or more foldable supports for contacting a floor of the truck bed.

In one embodiment, the hinge comprises a continuous hinge located along a length of the elongate bench portion. In another embodiment, the truck bed bench includes a cushion attached to the elongate backrest.

In another embodiment, in the stowed position the foldable supports are folded against an underside of the elongate bench portion and contact a side of the truck bed.

In a second aspect, a folding truck bed bench includes: an elongate bench portion hingedly attached along a length of a bed rail of the truck bed such that the elongate bench portion is substantially parallel to the bed rail of the truck bed; one or more foldable supports attached to the elongate bench portion for supporting the elongate bench portion; an elongate backrest hingedly attached to at least one of the bed rail and elongate bench portion. In a deployed position, the elongate bench portion is substantially parallel to a floor of the truck bed to such that the elongate bench portion provides a support surface. In a stowed position, the elongate bench portion is folded downward such that the elongate bench portion is adjacent a side of the truck bed. The elongate backrest is movable between an upright position and a folded position.

In one embodiment, the folding truck bed bench includes one or more feet attached to ends of the one or more foldable supports for contacting a floor of the truck bed.

In a third aspect, a folding truck bed bench includes: an elongate bench portion hingedly attached along a length of a bed rail of the truck bed such that the elongate bench portion is substantially parallel to the bed rail of the truck bed; one or more foldable supports attached to the elongate bench portion for supporting the elongate bench portion, the foldable supports including one or more feet attached to ends of the one or more foldable supports for contacting a floor of the truck bed; an elongate backrest hingedly attached to at least one of the bed rail and elongate bench portion. In a deployed position, the elongate bench portion is substantially parallel to a floor of the truck bed to such that the elongate bench portion provides a support surface. In a stowed position, the elongate bench portion is folded downward such that the elongate bench portion is adjacent a side of the truck bed. The elongate backrest is movable between an upright position and a folded position.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
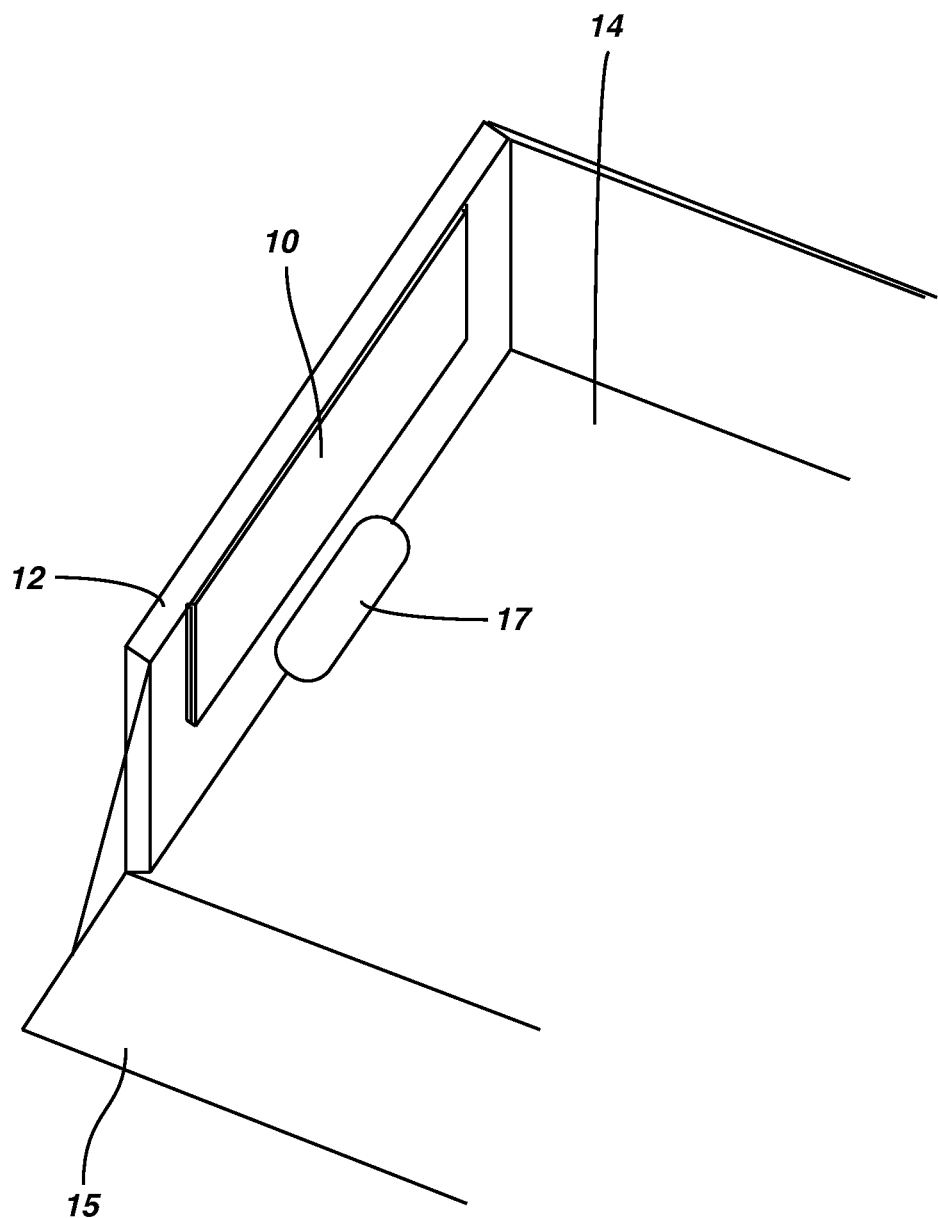
FIG. 1 shows foldable truck bed bench seat according to one embodiment of the present disclosure.
Figure 2:
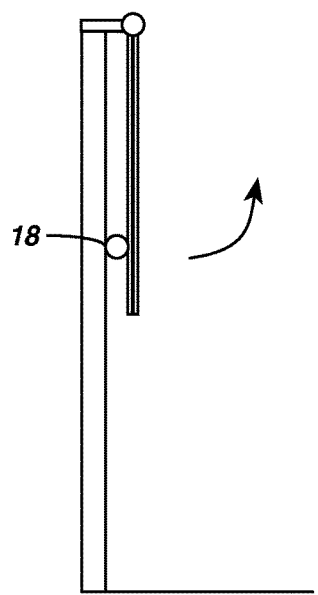
FIGS. 2-4 show a foldable truck bed bench according to embodiments of the present disclosure.
Figure 3:
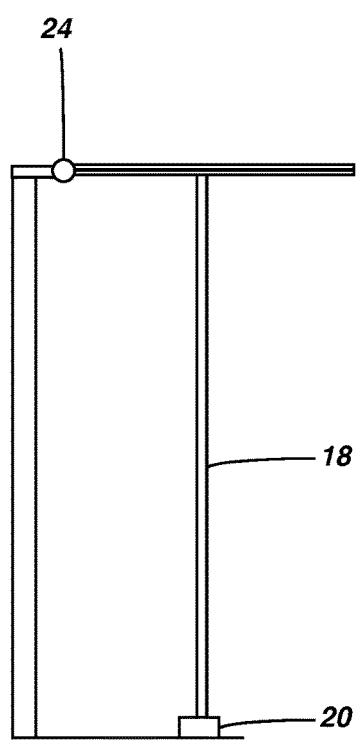
Figure 4:
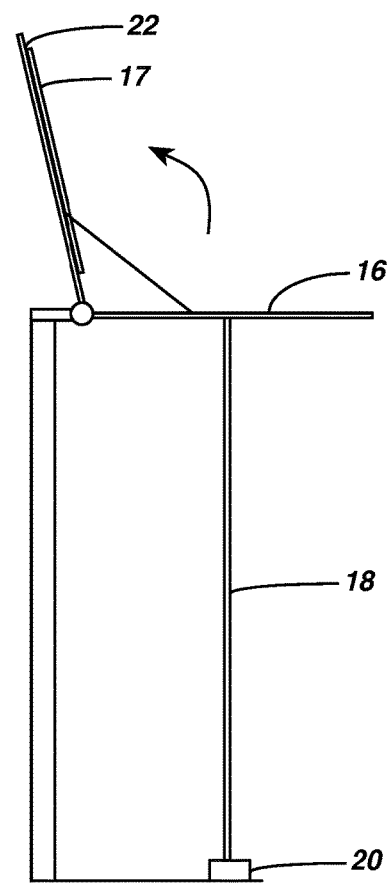

Referring to FIGS. 1 and 2, a folding truck bed bench 10 is provided for installation along a bed rail 12 of a truck bed 14. The truck bed 14 typically includes a tailgate 15 located at a back of the truck bed 14. The truck bed bench 10 is foldable such that in a folded position the bench is folded against a side of the truck bed 14. In a deployed position, the truck bed bench 10 is maintained in a position such that the truck bed bench 10 provides a surface for one or more occupants to sit along the truck bed bench 10.

The folding truck bed bench 10 includes an elongate bench seat portion 16. The bench seat portion 16 may include a cushion 17 or other padding for supporting one or more occupants seated along the bench seat portion 16 when the truck bed bench 10 is deployed, as discussed in greater detail below. The bench seat portion 16 is hingedly attached along the bed rail 12 such that the bench seat portion 16 pivots in relation to the bed rail 12. The bench seat portion 16 preferably has a length that is proximate a length of the truck bed. For example, for a short bed pickup truck, the bench seat portion 16 has a length of less than 6 feet such that the bench seat portion 16 fits within the truck bed 14 when the truck bed bench 10 is in a folded configuration. For a full size or long bed pickup truck, the bench seat portion may be longer than a short bed configuration, while still being shorter than a length of the bed.

The bench seat portion 16 preferably has a depth that is suitable for one or more occupants to be seated on the bench seat portion 16. Further, the bench seat portion 16 may have a depth such that when the bench seat portion 16 is folded against a side of the truck, the bench seat portion 16 does not contact a raised wheel well 17 of the truck in the truck bed 14.

The bench seat portion 16 is attached to the truck bed along the bed rail 12 using one or more of fasteners or clamps. A hinge bracket, continuous hinge, or other like assembly may secure the bench seat portion 16 to the truck bed 14 such that the bench seat portion 16 is able to pivot between open and folded positions.

The truck bed bench 10 may further include a plurality of folding legs 18 attached to an underside of the bench seat portion 16. The folding legs 18 may be attached to the bench seat portion 16 such that the folding legs extend perpendicular to the underside of the bench seat portion when opened and such that the folding legs 18 are substantially coplanar to the underside of the bench seat portion 16 when folded. The folding legs 18 may include feet 20 formed on ends of the folding legs 18 for contacting a floor of the truck bed 14 when the truck bed bench 10 is deployed.

In one embodiment, the truck bed bench 10 includes an elongate backrest 22 hingedly attached to the bench seat portion 16 with one or more hinges, such as continuous hinge 24. The hinge may include one or more stops or be limited in travel such that the backrest 22 resists opening beyond an upright position. In one embodiment, a strap or cable 26 is connected to the elongate backrest and bench seat portion 16 to maintain the elongate backrest 22 in an upright position for supporting a back of a user.

The elongate backrest 22 preferably has a length that is similar to a length of the bench seat portion 16. The elongate backrest 22 is movable between a folded position and an open position. In the folded position, the elongate backrest 22 is folded adjacent to the bench seat portion 16 such that the elongate backrest 22 and bench seat portion 16 are substantially flat. The backrest 22 preferably includes a cushion or other padding portion formed on the backrest 22 to improve comfort of occupants seated on the truck bed bench 10.

Figure 5:
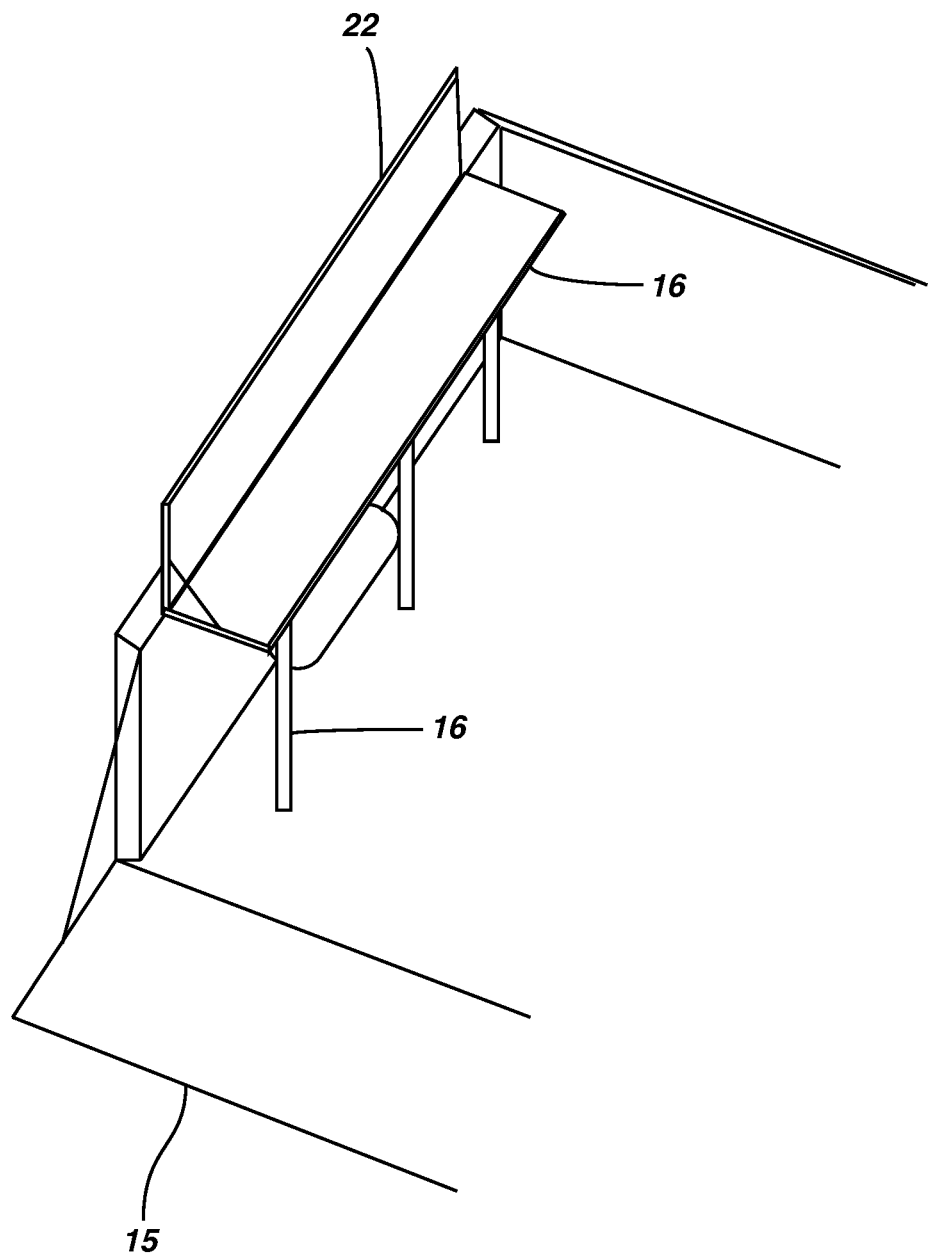
FIG. 5 shows a foldable truck bed bench in a deployed position according to one embodiment of the present disclosure.

In operation, the truck bed bench 10 is movable between a folded position (FIG. 1) and a deployed position (FIG. 5) depending on whether seating is needed in the truck bed 14. In the folded position, the bench seat portion 16 is folded against a side of the truck bed 14. The bench seat portion may be secured against the side of the truck bed using a latch or other similar mechanisms. When a user desires to deploy the truck bed bench 10, the user releases the latch and lifts the bench seat portion 16 until the bench seat portion 16 is substantially parallel to a floor of the truck bed 14. The folding legs 18 are unfolded such that the legs 18 extend from the bench seat portion 16 towards the floor of the truck bed 14. The folding legs 18 contact the floor of the truck bed 14 to support a weight of occupants seated on the truck bed bench 10.

To fold the truck bed bench 10 to a closed position, the user may slightly lift the bench seat portion 16 such that the folding legs 18 are no longer in contact with the floor of the truck bed 14. The folding legs 18 are moved into the folded position, at which point the bench seat portion 16 may be lowered adjacent to a side of the truck bed 14.

When the truck bed bench 10 includes a backrest 22, a latch or other mechanism may be included to maintain the backrest 22 against the bench seat portion 16 in the folded position. To deploy the truck bed bench 10 including the backrest 22, the user may first lift the bench seat portion 16 as described above, and then unfold the backrest 22. Similarly, when storing the truck bed bench 10 including a backrest 22, the user may first fold the backrest 22 against the bench seat portion 16 before folding the bench seat portion 16 against the side of the truck bed 14.

The truck bed bench 10 of the present disclosure advantageously provides additional seating to a plurality of occupants along sides of a truck bed. The truck bed bench is movable between a deployed position wherein several users may sit along a length of the truck bed bench, and a closed position wherein the truck bed bench does not obstruct usage of the truck bed.

While reference is made above to the truck bed bench 10 serving as a seat or bench for allowing one or more persons to sit on the truck bed bench 10, it is also understood that the truck bed bench 10 may form a support for other objects, such as a tool box or other items. For example, a tool box or other component may be mounted on the truck bed bench 10 and thereafter be foldable between deployed and stowed positions along a bed rail of the truck bed.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A folding truck bed bench for installation along a rail of a truck bed, the folding truck bed bench comprising:

an elongate bench portion hingedly attached along a length of a bed rail of the truck bed such that the elongate bench portion is substantially parallel to the bed rail of the truck bed;

one or more foldable supports attached to the elongate bench portion for supporting the elongate bench portion; and one or more feet attached to ends of the one or more foldable supports for contacting a floor of the truck bed;

wherein in a deployed position, the elongate bench portion is substantially parallel to a floor of the truck bed to such that the elongate bench portion provides a support surface; and wherein in a stowed position, the elongate bench portion is folded downward such that the elongate bench portion is adjacent a side of the truck bed.

2. The folding truck bed bench of claim 1, further comprising an elongate backrest hingedly attached to at least one of the bed rail and elongate bench portion, wherein the elongate backrest is movable between an upright position and a folded position.

3. The folding truck bed bench of claim 2, further comprising a cable attached to the elongate bench portion and elongate backrest to prevent movement of the elongate backrest beyond a desired upright position.

4. The folding truck bed bench of claim 2, further comprising a cushion attached to the elongate backrest.

5. The folding truck bed bench of claim 1, wherein the hinge comprises a continuous hinge located along a length of the elongate bench portion.

6. The folding truck bed bench of claim 1, wherein in the stowed position the foldable supports are folded against an underside of the elongate bench portion and contact a side of the truck bed.

7. A folding truck bed bench for installation along a rail of a truck bed, the folding truck bed bench comprising:

an elongate bench portion hingedly attached along a length of a bed rail of the truck bed such that the elongate bench portion is substantially parallel to the bed rail of the truck bed;

one or more foldable supports attached to the elongate bench portion for supporting the elongate bench portion;

one or more feet attached to ends of the one or more foldable supports for contacting a floor of the truck bed; and an elongate backrest hingedly attached to at least one of the bed rail and elongate bench portion;

wherein in a deployed position, the elongate bench portion is substantially parallel to a floor of the truck bed to such that the elongate bench portion provides a support surface;

wherein in a stowed position, the elongate bench portion is folded downward such that the elongate bench portion is adjacent a side of the truck bed; and wherein the elongate backrest is movable between an upright position and a folded position.

8. A folding truck bed bench for installation along a rail of a truck bed, the folding truck bed bench comprising:

an elongate bench portion hingedly attached along a length of a bed rail of the truck bed such that the elongate bench portion is substantially parallel to the bed rail of the truck bed;

one or more foldable supports attached to the elongate bench portion for supporting the elongate bench portion, the foldable supports including one or more feet attached to ends of the one or more foldable supports for contacting a floor of the truck bed;

an elongate backrest hingedly attached to at least one of the bed rail and elongate bench portion;

wherein in a deployed position, the elongate bench portion is substantially parallel to a floor of the truck bed to such that the elongate bench portion provides a support surface;

wherein in a stowed position, the elongate bench portion is folded downward such that the elongate bench portion is adjacent a side of the truck bed; and wherein the elongate backrest is movable between an upright position and a folded position.

* * * * *